United States Patent [19]
Gaffney et al.

[11] 3,917,889
[45] Nov. 4, 1975

[54] EXTRUDED TUBULAR NET PRODUCTS

[75] Inventors: Bernard J. Gaffney, Stillwater; Ronald L. Larsen, Minneapolis, both of Minn.

[73] Assignee: Conwed Corporation, St. Paul, Minn.

[22] Filed: July 2, 1973

[21] Appl. No.: 375,671

Related U.S. Application Data

[60] Continuation of Ser. No. 189,906, Oct. 18, 1971, abandoned, which is a division of Ser. No. 877,686, Nov. 18, 1969, abandoned.

[52] U.S. Cl. ............... 428/36; 264/103; 264/167; 264/177; 264/DIG. 47; 264/DIG. 81; 428/131; 428/134; 428/212; 428/213
[51] Int. Cl.² ............... B29C 19/00; D04H 3/16
[58] Field of Search ............... 161/109, 117, DIG. 6; 264/103, 167, 177, DIG. 47, DIG. 81; 156/244, 441, 500; 18/12

[56] References Cited
UNITED STATES PATENTS

| 3,252,181 | 5/1966 | Hureau | 18/12 |
| 3,365,352 | 1/1968 | Van Burleigh | 161/109 |
| 3,384,530 | 5/1968 | Mercer | 161/109 |
| 3,700,521 | 10/1972 | Gaffney | 161/109 |

*Primary Examiner*—Marion E. McCamish
*Attorney, Agent, or Firm*—Eyre, Mann & Lucas

[57] ABSTRACT

Extruded tubular net-like products are disclosed. The tubes comprise a plurality of spaced parallel longitudinal strands and a plurality of spaced transverse strands extruded integrally therewith. The transverse strands have variable spacing between them or are of variable width.

2 Claims, 14 Drawing Figures

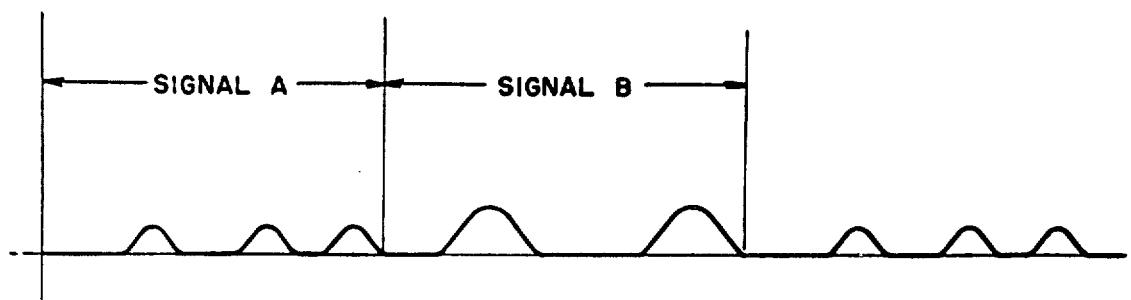
FIG.6
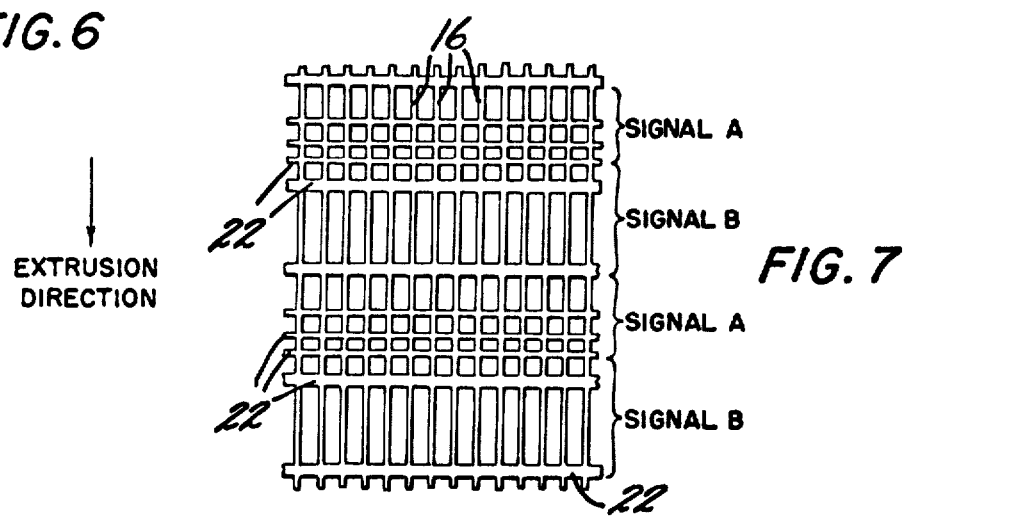
FIG.7
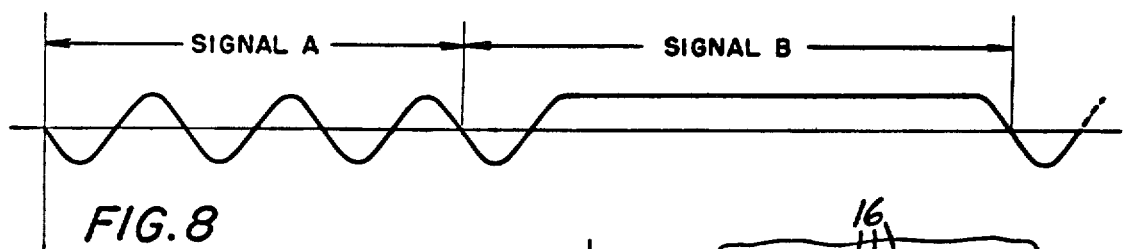
FIG.8
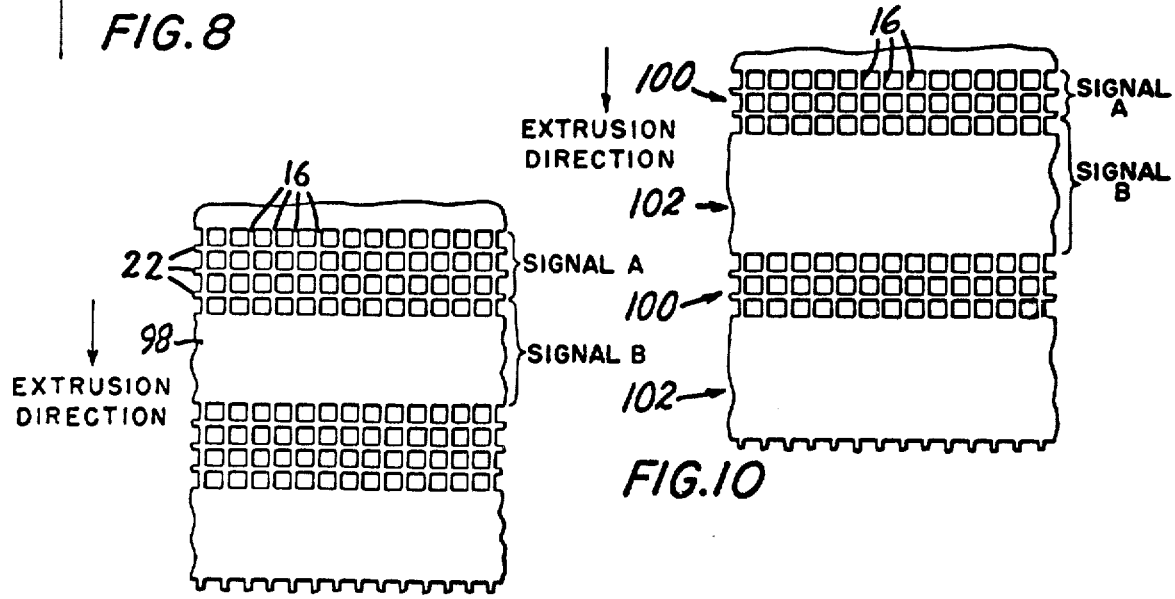
FIG.9
FIG.10

EXTRUDED TUBULAR NET PRODUCTS

This is a continuation application Ser. No. 189,906, filed Oct. 18, 1971 and now abandoned which in turn was a divisional of application Ser. No. 877,686 filed Nov. 18, 1969, and now abandoned.

In U.S. Pat. No. 3,252,181 and in U.S. Pat. No. 3,384,692, various forms of apparatus are described for extrusion of plastic tubes, plastic net and net-like structures. Some of these apparatuses include two coaxial die members which may be reciprocated between two different positions. In the so-called closed position, co-acting cooperative surfaces of the die members are in contact with each other and in this position a plurality of spaced strands of plastic may be extruded through grooves in the face of one of the die members. In a second so-called open position, the two die members are separated to extrude an annular strand of plastic that is integral with the spaced strands and arranged transverse thereto. By reciprocating the die members at speeds up to one hundred cycles per second a net-like structure is formed. The structure may be in the form of an open network of strands or it may be a solid sheet reinforced with one or more of the strands. A wide variety of structures may be formed depending upon the construction of the die and control thereof. In some cases, one or more of the die members may be rotated or oscillated and simultaneously one or more of the die members may be reciprocated.

In operating such apparatus to produce net-like products having specified dimensions, it is important to have precise control of the motion of the die members. The length of the spaced parallel strands of plastic between the transverse strands depends primarily on the time that the die members are maintained in the closed position and there are also secondary effects on the thickness or cross sectional area of these strands caused by the variable orifice conditions. The cross sectional dimensions of the transverse strands depends on the displacement distance between the two die members which controls the transverse strand radial thickness and the time the members are maintained in open position, which controls the extrusion direction length of the transverse strands. Therefore, properly dimensioned net products can be made if the cyclical or reciprocal displacement motion is carried out with a high order to precision and reproducibility. Moreover, in order to manufacture uniform relatively fine mesh plastic net similar to window screening, the reciprocal or cyclical motion may have to be carried out at a frequency of up to 40 cycles or more presecond. With such high frequencies, the problems of maintaining a controlled displacment motion are compounded, since the margin for tolerable deviations in the displacement motion and consequently in the product is extremely small, and the forces exerted and to be controlled are large and have abrupt peaking values.

The words cyclical and reciprocal are used interchangeably in the specification and claims and either word refers to both uniform and non-uniform displacement motion.

The present invention provides an apparatus and methos for carrying out very precise reciprocal or cyclical displacement motion in extrusion apparatus of the types described above. More particularly, the invention involves use of a hydraulic cylinder and a double faced piston therein for directly controlling the displacement motion of one or two die members and means for controlling the flow of oil or other pressure-transmitting fluid into and out of the hydraulic cylinder in response to electric signals having wave forms correlated to the desired reciprocating motion. In a particularly desirable embodiment of the invention, a first signal is generated having a wave form which correlates to a desired reciprocating displacement motion by the die members, and a monitoring means is employed to track the actual motion of the members and generate a second signal having a wave form which corresponds to said actual motion. The first and second signals are continuously compared and a variable third signal is generated which compensates for any detected differences between the first and second signals, the compensation tending to eliminate such differences and conform the actual motion of the die members to that dictated by the first signal. This continuously adjusted third signal is transmitted to a control valve which controls the flow of oil into and out of the hydraulic cylinder, which is in a hydraulic loop containing a reservoir, pump, regulators and conduits for providing the operative oil to the hydraulic cylinder.

If desired, the cyclical motion of the die members may be made such that the die members are always in open relationship to produce a tube or sheet of polymer having a varying cross sectional thickness dictated by the programmed movement of the die members.

Further details of the invention will be readily understood by reference to the accompanying drawings which illustrate various embodiments thereof and in which:

FIG. 6 is a graph showing the wave form of still another signal which may be generated and utilized in a particular mode of operation of the system of FIG. 1;

FIG. 7 is a side view of a portion of plastic net-like product which may be manufactured when the system of FIG. 1 is operated with the wave form of FIG. 6.

FIGS. 8–14 are side views of portions of plastic net-like products which can be manufactured when the system of FIG. 1 is operated in the alternate mode of operation referred to in connection with FIG. 8.

Figure 1:
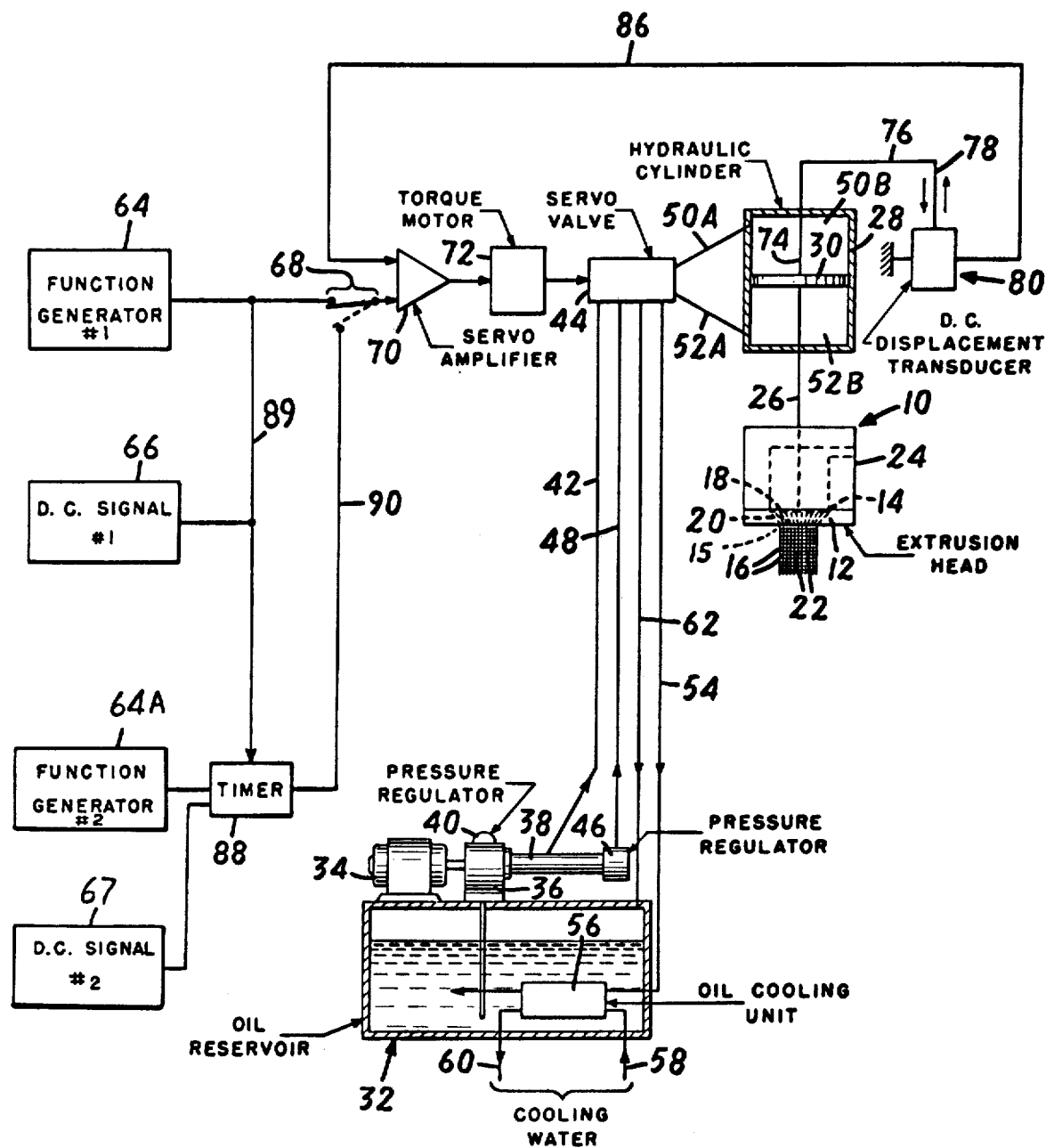
FIG. 1 is an overall view of the preferred system for extruding plastic net-like structures in accordance with the invention.

Referring now to FIG. 1, an extrusion apparatus of the type disclosed in U.S. Pat. No. 3,252,181 is there denoted by reference numeral 10. This apparatus includes a first stationary die member 12 in the form of a ring having an operative surface 14 which slants inwardly from the top to bottom thereof. The member 12 is provided with a plurality of grooves 15 spaced apart equal distances 360° around the entire die member. These grooves provide channels for flow of spaced streams of molten plastic material which exit from the lower ends of the grooves and form spaced vertical longitudinal strands 16. The apparatus further includes a second die member 18 which is in the form of a solid circular plate having an operative surface 20 which also slants inwardly from the top to the bottom thereof, matching the slant of operative surface 14 of the die member 12. When member 18 is in a down or closed position, its operative surface 20 seats upon the operative surface 14 of member 12, whereby the spaced vertical longitudinal strans 16 exit from the die. When member 18 is elevated to a higher or open position, a continuous open annulus is formed between the operative surfaces 20 and 14 of member 18 and 12, which annulus is in communication with all of the grooves in the ring member 12. Therefore, in this position of the members, an annular transverse strand of molten plastic exits from the continuous open annulus to form the single transverse strand 22 which is integral with and, in effect, a transverse continuation of the spaced longitudinal vertical strands 16. The apparatus also includes a polymer inlet 24 through which molten plastic material is pumped into the interior of the apparatus, which is provided with suitable heating means (not shown) for maintaining the material in molten flowable condition. As member 18 is periodically lowered and raised into and out of contact with the ring member 12, a plastic net or net like structure is formed by the resulting reciprocal displacement motion which alternately allows the single transverse strands 22 to exit from the die integral with the continuous longitudinal strands 16.

In accordance with the invention, member 18 is attached to a shaft 26 which passed up out of extruder 10 and into a hydraulic cylinder 28. The shaft 26 is attached to a double-faced piston 30 disposed within the cylinder 28, with the periphery of the piston sealed in conventional manner in fluid tight relation with the inside wall of the cylinder.

A tank 32 holds a supply of oil or other pressure transmitting fluid. An electric motor 34 drives a hydraulic pump 36 which pumps oil out of reservoir 32 and into conduit 38. The pump 36 is provided with a screw-adjustable regulator 40 whereby the output pressure of pump 36 is set at a steady value of, for example, 2000 psi. A conduit 42 branches from conduit 38 to deliver oil under pressure of pump 36 into the servo valve 44 (Type SA 4 Series available from Vickers Incorporated). Conduit 38 is provided with another pressure regulator 46 which may be screw-adjustable to provide an output into conduit 48 of oil at a lower pressure, for example 1000 psi, as compared to the pressure in conduit 42. Conduit 48 delivers the oil at lower pressure also into servo valve 44.

Servo valve 44 is connected to two conduits 50A and 52A. Conduit 50A communicates with the space 50B above the top face of piston 30, and conduit 52A communicates with the space 52B below the piston 30. Conduit 54 provides a return path for the oil pumped to the servo valve 44 via conduit 42, this return path leading into a heat exchanger 56 by which the oil may be cooled before it is emptied into the reservoir 32 by means of a cooling medium circulated through the cooler 56 via the input and output conduits 58 and 60 respectively. Conduit 62 provides a return path for the oil pumped at lower pressure into the servo valve via conduit 48 and empties directly back into the reservoir 32.

The foregoing description relates to the hydraulic loop that connects reservoir 32, servo valve 44 and the hydraulic cylinder 28 in an endless path.

Figure 2:
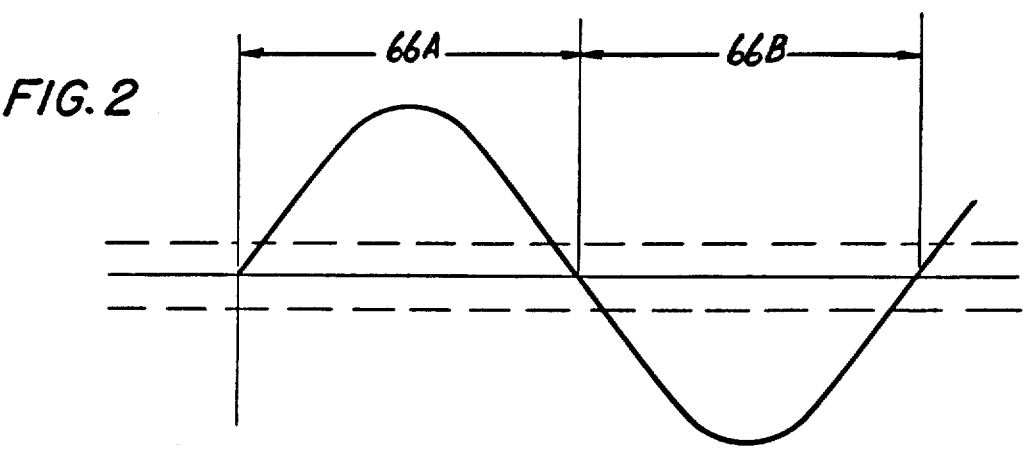
FIG. 2 is a graph showing the wave form of a first signal which is generated and utilized in the system of FIG. 1.

Referring now to the system used to generate signals which control the hydraulic means for oscillating the die member 18, numeral 64 designates a conventional function generator which is electrically powered by the ordinary 120 volt 60 cycle source to generate an adjustable signal having a periodic wave form such as illustrated in FIG. 2. In this particular figure, the wave form defined by voltage values (ordinate) versus time (abscissa) is a sine wave generated by the function generator 64.

The sine wave shown in FIG. 2 constitutes one cycle of operation and in operation the generator 64 is set at the desired wave form and cycle frequency. Signal generator 64 is capable of generating signals up to 1,000,000 cycles per second but the practical upper limit of operation of the extrusion apparatus is about 100 cycles per second. The amplitude of the wave of function generator 64 can be varied by a DC potentiometer (not shown) or by any other conventional means.

In addition to the function generator 64, there is a D.C. generator 66 by which voltage is added to or subtracted from the wave form signal delivered by generator 64 and thereby the position of the wave can be shifted up or down without changing its shape or frequency as indicated by the dotted line position of the abscissa in FIG. 2. The D.C. generator 66 merely changes the bias of the wave form to produce a position change but not a shape or frequency change. In effect, the added or subtracted D.C. voltage shifts the wave and abscissa up and down to the dotted line position of the abscissa in relation to the ordinate. The position of the abscissa with respect ot the closed position of the die members 12 and 18 determines the relative amount of time the dies will be open and closed. If the abscissa corresponds to the position in which the die members are just barely closed, the curve is shifted by means of D.C. generator 66 to bring the abscissa into the position where the die members are just barely closed and in such case operation of the die members will follow the program of the wave form. The open time is represented by interval 66a on the sign curve of FIG. 2 and the closed time is represented by interval 66b.

In certain applications, it may be desirable to depress the sign curve by means of D.C. generator 66 to bring the abscissa to a point below the die closed position. This will result in decreasing the amplitude of the die member in its open position and it will decrease the open time of the die member 18 relative to its closed time. The amplitude of die member 18 is a function of the selected wave form and the amplitude determines the radial thickness of transverse strands 22.

In order to vary the open-closed time relationship of the die members by means of DC generator 66 without changing the radial thickness of the transverse strands 22, the potentiometer (not shown) of function generator 64 is adjusted to change the signal wave amplitude to achieve the desired strand radial thickness. Conversely, by raising the sign curve to bring the abscissa to a point above the closed position of the die, the open time of the die members will be lengthened relative to the closed time.

The function generator 64 may be set in known manner to generate any desired wave form such as square waves, triangular waves, sawtooth waves, and ramp or half waves may also be used. The ramp and sawtooth waves are of advantage in that this form will give a slower opening movement of die member 18 than that provided by the sine wave and the ramp and sawtooth waves give a very quick closing movement. Since pressure on the plastic material is relatively high when the die starts to open and relatively low during the closing movement, a slow opening and quick closing tends to balance the extrusion operation.

If desired, function generator 64 may be replaced by a function as a conventional curve following signal generator which will produce an electric signal in accordance with the followed curve. In this manner, any type of curve may be electrically reproduced and therefore any type of displacement motion of die 18 may be produced to achieve net products having heretofore unknown shapes.

Generator 64 may also be adapted to function as a variable period generator which in known manner may separately vary the period and amplitude of the portion of the wave form that controls the open time of the die members and separately the portion that controls the closed time of the die members.

A second function generator which produces a trigger signal may be used in known manner in conjunction with function generator 64. If the trigger signal is a square wave form of 20 cps. and the function generator 64 is set to produce a single wave comprised of half sine wave plus an equal period zero voltage with a predetermined amplitude at a predetermined frequency, say 40 cps. then 20 times per second, one cycle of the wave form of function generator 64 will be triggered. Since only twenty of the forth cycles of the wave form of the function generator are triggered in any one second and since the die is only open for one half of each triggered cycle, the ratio of the open time to the closed time of the die is 1 to 3. The use of the trigger signal adds greater flexibility to the various combinations that may be employed for the relationship of the open to closed time of the die.

In the three alternate types of function generators described above, it is desirable to retain D.C. signal generator 66 whereby an adjustment may be made to vary the position of the wave form generated by signal generator 64 with respect to the ordinate to coincide with the actual closed position of the dies with the abscissa of the selected generated wave form.

In any of the alternate embodiments above described, the wave form may be chopped for example by removing the wave form portion which represents the die closed time period. In such case, the function generator will not generate a signal during the die closed time period. This may be desirable to reduce wear of the dies due to excessive pressure between them during the die closed period.

During operation of the extrusion apparatus 10, the output of function generator 64 is set to provide an amplitude and frequency in the wave form which correlates to a desired reciprocal motion of die member 18 and then D.C. generator 66 is adjusted to correlate the abscissa to the barely closed position of the die. The resulting operating signal is transmitted through switch 68 to servo amplifier 70 where it is amplified and then transmitted to a torque motor 72 which oscillates in response and synchronizes the servo valve 44 to the operating signal.

As the wave form rises to its maximum amplitude in the first portion of the cycle (66A) thus dictating elevation of the die member 18 to its maximum height, the servo valve 44 is controlled to switch itself internally to allow oil to flow from the valve into conduit 52A and from conduit 50A back into the valve. As a result the high pressure (2000 psi.) oil delivered by conduit 42 to the servo valve 44 is caused to flow into the space 52B below the bottom face of piston 30 and out of the space 50B above the top of piston 30 whereby the piston is elevated and the attached die member 18 is also raised. As the wave in the first portion of the cycle decreases in amplitude, the lower voltage changes the direction of the torque motor 72 whereby the servo valve operation is reversed. Specifically, the servo valve 44 switches internally to allow oil to flow from the valve into conduit 50A and from conduit 52A back into the valve, therefore, the high pressure oil delivered by conduit 42 and to the servo valve is caused to flow into the space 50B above the top face of the piston and out of the space 52B below the piston 30, whereby the die member 18 is depressed into its closed position in contact with die member 12. The lower pressure oil delivered from pressure regulator 46 into conduit 48 to the servo valve 44 and returned by conduit 62 to the reservoir 32 gives a hydraulic assist in conventional manner to the movement of the servo valve parts and does not flow into the hydraulic cylinder 28. This hydraulic assist helps to maintain the servo valve operation uniform, particularly at high frequency operation.

From the foregoing, it will be appreciated that the reciprocation of the die member 18 and up and down vertically to accomplish a reciprocable displacement motion between this member and ring member 12 is carried out directly by hydraulic fluid pressure acting on the double-faced piston 30. The flow of oil into and out of the hydraulic cylinder 28 is controlled by electrical signals emanating from the function generator 64 and the DC signal generator 66 and transmitted through switch 68, servo amplifier 70 and torque motor 72 to the servo valve 44.

In order to increase the precision of the reciprocable displacement motion, the actual motion of the piston of die member 18 is monitored and a signal corresponding to the actual motion is generated and fed back to the servo amplifier 70. An overhead shaft 74 which is attached to the top face of piston 30 passes up through the top of hydraulic cylinder 28. The overhead shaft 74 is in turn connected to a crossbar 76 which is connected to the core arm 78 of a direct current displacement transducer 80 (Type series 24 DCDT available from Hewlett-Packard). The transducer 80 has a coil assembly (not shown) which is energized with 24 volt DC current and arranged to cooperate with a coaxial core (not shown) the position of which is determined by the connected core arm 78 as it rises or falls relative to the coil assembly. Thus, as the die member 18 reciprocates up and down vertically, the rigid mechanical connections 74, 76 and 78 cause the core to reciprocate with the same motion as that of the member 18 in terms of amplitude and frequency. The resulting displacements of the core along the axis and within the bore of the core assembly produce output voltage changes proportional to the displacements, whereby transducer 80 generates a signal corresponding to the actual motion of die member 18 and this signal is fed through connector 86 into the servo amplifier 70.

Figure 3:
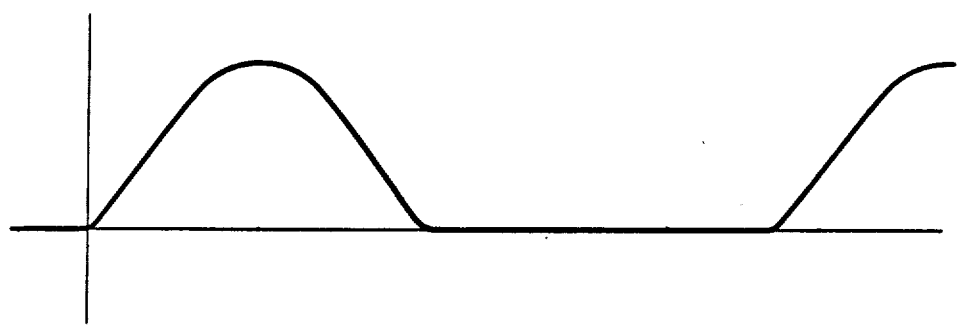
FIG. 3 is another graph showing the wave form of a second signal which is generated and utilized in the system of FIG. 1.

FIG. 3 illustrates a wave form of the signal that may be generated by the transducer 80 in response to movement of die member 18 for the sine wave of FIG. 2. The wave form of FIG. 3 will necessarily be similar to the wave form generated by function generator 64. As will be noted in the die open portion of the cycle, the signal corresponds to the die open portion of the wave form signal transmitted to the servo amplifier 70 from the generators 64 and 66. However, in the die closed portion of the cycle, the core arm 78 and consequently the connected core remains stationary within the coil assembly of transducer 80 and therefore a steady output voltage emanates from the transducer into the line 86 when member 18 is closed against die member 18. This differs from the operating wave form signal shown in FIG. 2 and the difference is used to advantage in a way to be described below.

When the signal from transducer 80 is fed into servo amplifier 70, it is compared electrically with the operating signal transmitted from the generators 64 and 66. If the signals are different, the output of the servo amplifier 70 is automatically adjusted to provide compensation, so as to eliminate the difference and tend to restore the combined output signal of the amplifier to that corresponding to the wave form transmitted from generators 64 and 66. More specifically, if at any point along the time axis the voltage of the FIG. 3 signal is lower than that of the FIG. 2 signal, then the gain of the servo amplifier 70 is automatically increased to compensate for the detected difference and thereby restore the motion of die member 18, and concommitantly the value of the FIG. 3 signal, to that of the FIG. 2 signal. Conversely, if the compared voltage values at any point along the time axis detect that the FIG. 3 signal is higher than the FIG. 2 signal, then the gain of the servo amplifier 70 is automatically decreased to compensate for the detected difference in an opposite direction and again thereby restore the motion of die member 18 and concommitantly the value of the FIG. 3 signal to that of the FIG. 2 signal. In this way, deviations of the motion of the die member 18 from the motion dictated by the FIG. 2 signal are constantly monitored and compensated, so that a variable third output signal of the servo amplifier 70 is generated continuously and fed to the torque motor 72 for controlling the motion of the piston and die member 18 to that motion which is dictated by the FIG. 2 signal.

As previously mentioned, in the die closed portion of the cycle, the value of the FIG. 3 signal will always vary considerably from that of the FIG. 2 signal, since the die member 18 physically cannot move down to a position lower than its closed contacting position on the stationary ring member 12. Therefore, in the die closed portion of the cycle, the servo amplifier 70 will always increase its gain and attempt to compensate for this large variation. As a result, additional pressure will be generated on the top of piston 30. In this way, the closing pressure of the die members 18 and 12 is increased to insure that the dies will be tightly sealed to allow only the spaced vertical longitudinal strands 16 to be extruded, without polymer leakage between the other contacting surfaces of the dies. If desired, this may be achieved with the alternate function generator described previously by simply adjusting DC generator 66 to lower the generated wave form in relation to the ordinate whereby there will be a difference between the generated signal and the signal generated from transducer 80 to increase the pressure upon the top of the piston 30 during the die closed time. In such case, there will be a change in the open to closed time relationship of the die members as described above.

The normal operation of the system described above is carried out by maintaining switch 68 in its full line position shown in FIg. 1. In a modified emobidment of the invention, the switch 68 may also assume an alternate position shown by the dotted lines. In this position, the wave form signal of the combined outputs of function generator 64 and D.C. generator 66 is fed into a conventional timer 88 by means of line 89 and from the timer through line 90 to switch 68 and the servo amplifier 70. Timer 88 is also connected to a second function generator 64A and to a second DC generator 67 each of which may feed an output signal into timer 88.

The function generator 64A may be of any type similar to function generator 64 and the alternate embodiment thereof. Further, function generator 64A need not be the same as the particular embodiment being used as function generator 64 and the function generator 64A may also be eliminated entirely with the retention of DC signal generator 67 by itself whereby only a DC function from DC generator 67 instead of a wave form is fed to timer 88. The timer 88 may be set to alternately switch to each of the desired input signals and transmit such signals for a specified time period an output signals into the line 90 and timer 80 may be set to transmit any combination of the input signals. The signals fed into switch 68 by timer 80 will control the movement of the die members as previously described hereinabove.

Figure 4:
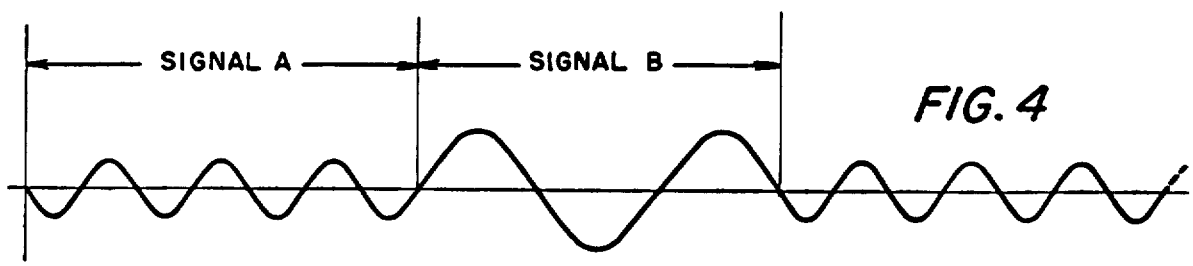
FIG. 4 is a graph showing the wave form of another signal which may be generated and utilized in a particular mode of operation of the system of FIG. 1.

FIG. 4 illustrates the type of wave signals that may be employed to control movement of the die members. Signal A is a sine wave generated by function generator 64 and DC generator 66 while signal B is also a sine wave of greater amplitude and period generated by function generator 64A and DC generator 67. Timer 88 is set to switch back and forth between signal A and signal B.

Figure 5:
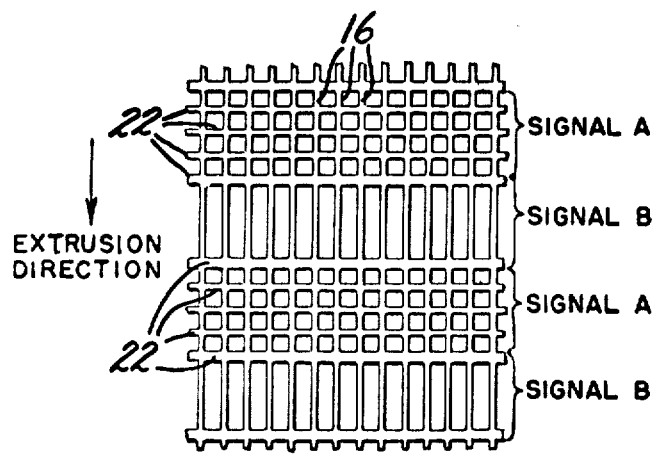
FIG. 5 is a side view of a portion of plastic net-like product which may be manufactured when the system of FIG. 1 is operated with the the wave form of FIG. 4.

The product resulting from such a mode of operation is illustrated in FIG. 5. As there shown, the product consists of a first portion of net structure having spaced longitudinal vertical strands 16 and integral transverse strands 22 having a radial thickness corresponding to the amplitude of the wave of signal A of FIG. 4. The extrusion direction length of the strand and spacing between strands in the direction of extrusion will correspond to the die open and closed portions of the wave of signal A of FIG. 4. The second portion of the integral net structure has the spaced longitudinal vertical strands 16 and integral transverse strands 22 with a radial thickness and length and spacing in extrusion direction corresponding respectively to the amplitude and period of the wave of Signal B of FIG. 4. The length of the first and second portion of net structure of FIG. 5 is determined by the setting used in timer 88 and although the product of FIG. 5 illustrates equal time periods for signal A and signal B, the timer 88 may be set to switch at unequal times. It will be seen that the length in extrusion direction of the transverse strands of signal B is greater than the length of the transverse strands of signal A. Also, there are only two transverse strands in the net of signal B while there are three transverse strands in the net of signal A even though the extrusion length of the net section for signals A and B is equal. This is due to the fact of the difference in the sine wave A and B.

If for instance, a curve follower function generator is used as function generator 64 to generate signal A and the generated wave form is of a decreasing period as depicted in FIG. 6 and generator 64A is chosen, for instance to generate a chopped sine wave as signal B, and the timer 88 is set to switch from A to B at equal periods of time, then the product will be that depicted in FIG. 7. As will be seen, the product consists of a first portion of net structure corresponding to signal A of FIG. 6 in which the integral transverse strands 22 are unequally spaced from each other and a second portion corresponding to signal B of FIG. 6 in which the integral transverse strands 22 are of greater length in the direction of extrusion and equally spaced from each other in the net. If a function generator capable of generating a variable signal is selected from the group of function generators described above for generator 64 then the net structures of FIGS. 5 and 7 may be produced without the need of second function generator 64A or DC generator 67.

The signal wave of another embodiment is shown in FIG. 8 in which function generator 64A is not used and D.C. generator 67 is used to generate signal B, which is used in conjunction with signal A of generator 64 and 66 by means of timer 88. In this case, the D.C. signal B is a steady voltage which holds the die member 18 in a fixed position at a height above the ring die member 12 corresponding to the amplitude of the steady voltage shown as a straight line of Signal B in FIG. 8. During this time, a continuous sheet of molten polymer material is extruded from the continuous open annulus defined by the elevated die member 18 above the ring die member 12. The length of this sheet in extrusion direction is controlled by the period of time over which the timer 88 is set to transmit the signal B from generator 67. When the end of that time is reached, the timer 88 switches back again to transmission of the combined signal from wave form generator 64 and DC generator 66, into the line 90, whereby reciprocation of the piston die member 18 is resumed. In this embodiment, timer 88 is preferably set to transmit signal A for a period of about 0.03 to 10 seconds and to transmit signal B for a period of about 0.015 to 2 seconds.

The product resulting from such a mode of operation is illustrated in FIG. 9. As will be seen, the product consists of alternating portions of net structure having the spaced longitudinal vertical strands 16 and integral transverse strands 22 and a solid sheet of plastic material 98, which portions correspond respectively to the alternate signal outputs of timer 88 fed into the line 90. In the product illustrated in FIG. 9, the alternating portions of net and of solid sheet have equal lengths in the direction of extrusion, owing to the setting of the timer 88 to equal alternate time periods and the resulting equal time periods of duration of the reciprocal and straight line wave forms in FIG. 8. However, by variation of the settings of the timer 88 many other shapes and sizes of plastic net like products can be made.

Figure 11:
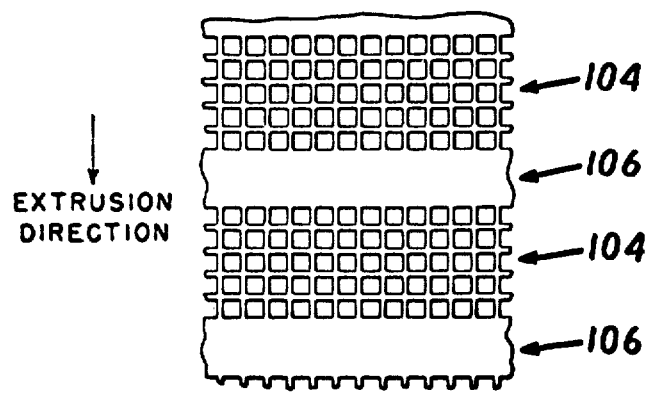

For example, the timer 88 may be set to transmit the reciprocal signal for a shorter time period, than the steady D.C. signal, whereby the duration of the alternate reciprocal wave forms in the signal will be less than the alternate straight line wave forms. The structure of the product from this mode of operation is illustrated in FIG. 10 and consists of the alternate net portions 100 and alternate solid sheet portions 102, with the lengths of the net portions being shorter than the lengths of the solid sheet portions in the direction of extrusion. Conversely, if the timer 88 is set to transmit the reciprocal signal for a longer time period than the steady D.C. signal, the reciprocal wave form portions of the signal will predominate in time duration over the straight line portions. The structure of the resulting product is illustrated in FIG. 11 and again consists of alternating net portions 104 and solid sheet portions 106 but with the lengths of the net portions being longer than the lengths of the solid sheet portions in the direction of extrusion.

Figure 12:
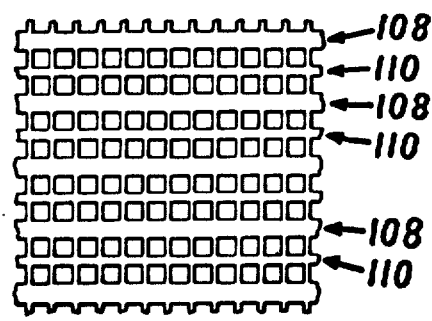
Figure 13:
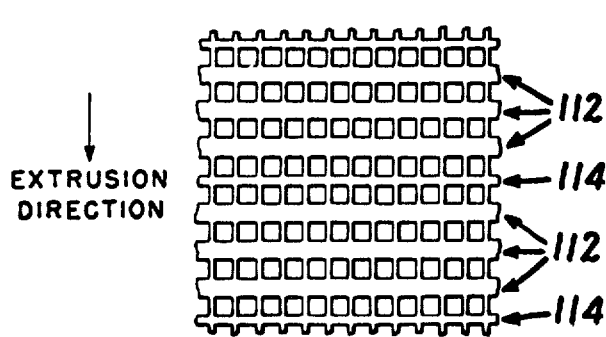

Other variations of structure may be made by correlating the frequency of the wave form portion of the signal with the settings of timer 88. For example, if the wave form generator 64 is set to generate a sinusoidal wave at the frequency of 1 cycle per second, the time duration of the first half of each wave in each cycle will be 0.5 second. If the timer 88 is set to transmit the reciprocal signal for 1 second and the steady DC signal for less than 0.5 second, then a plastic net will be extruded having transverse strands of alternating larger and smaller cross section corresponding respectively to the longer open time of die member 18 dictated by the 0.5 second portion of the reciprocal wave form, which is allowed to be operative once each second by the timer 88, and the shorter open time of die member 18 dictated by the shorter period of the straight line portion transmitted by the timer. Such a product is illustrated in FIG. 12 and consists of the larger cross section transverse strands 108 alternating with smaller cross section transverse strands 110.

Figure 14:
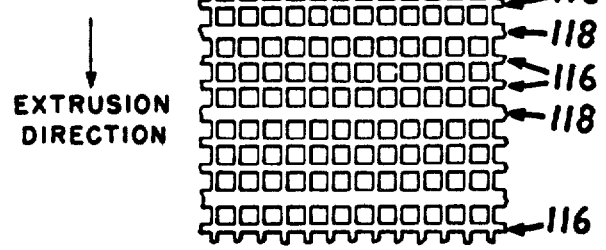

Further structural forms may be achieved with other correlations of reciprocal wave form frequency and settings of timer 88. For example, if the wave form generator 64 is set to generate a sinusoidal wave at a frequency of 3 cycles per second, then the time duration of each of the first halves of the three waves comprising the three cycles will be 0.167 second. If timer 88 is again set to transmit the reciprocal signal for 1 second and the steady DC signal for more than 0.25 second, then a plastic net will be extruded having alternately two relatively small cross section transverse strands and one relatively large cross section transverse strand. Such a structure is illustrated in FIG. 14, reference numeral 116 denoting the relatively small cross section transverse strands which are extruded during elevation of the die member 18 for 0.25 second each time in 1 second of operating during transmission of the reciprocal signal by the output of timer 88, and reference numeral 118 denoting the alternate signal relatively large cross section transverse strand which is extruded during elevation of the die member 18 for longer than 0.25 second during transmission of the steady DC voltage.

The invention has now been described in terms of its operating principles as illustrated by specific embodiments thereof. The invention provides a means and method for operating an extrusion apparatus of the type described with exceptional precision and control whereby products of varying size, shape and dimension can be made continuously and with great uniformity. Additionally, entirely new products are achieved which were not previously known to the art and hence the structure of such products is also comprehended by the invention.

While it is preferred to employ a hydraulic system for reciprocating one of the die members, it will be understood that other means may be employed for generating the reciprocating action of the member and in such case the actual position of the two die members may be sensed by means of the above described displacement transducer or equivalent thereof and fed back to the programmed input in order to compare the actual position of the die members to the programmed position and to make the corrections necessary to corrolate the actual position of the die members to the programmed position.

It will be understood that it is intended to cover all changes and modifications of the preferred embodiments of the invention herein chosen for the purpose of illustration which do not depart from the spirit and scope of the invention.

What is claimed is:

1. An extruded plastic net-like seamless tubular structure comprising substantially parallel spaced solid longitudinal strands and substantially parallel spaced solid transverse strands said transverse strands being extruded integral with and normal to said longitudinal strands and at least one of said transverse strands being extruded of a larger cross sectional dimension than the cross sectional dimension of other of the transverse strands.

2. An extruded plastic net-like seamless tubular structure comprising substantially parallel spaced solid longitudinal strands and substantially parallel spaced solid transverse strands said transverse strands being extruded integral with and normal to said longitudinal strands at least one of said transverse strands being extruded having a spacing between it and an adjacent transverse strand greater than the spacing of other of the transverse strands.

* * * * *